US006533321B2

(12) United States Patent  (10) Patent No.: US 6,533,321 B2
Class et al.                (45) Date of Patent:      Mar. 18, 2003

(54) VEHICLE OCCUPANT RESTRAINT SYSTEM (75) Inventors: Uwe Class, Schechingen (DE); Thomas Kielwein, Eschach (DE); Michael Lüders, Althengstett (DE)

(73) Assignee: TRW Occupant Restraint Systems GmbH & Co. KG

( * ) Notice: Subject to any disclaimer, the term of this patent is extended or adjusted under 35 U.S.C. 154(b) by 4 days.

(21) Appl. No.: 09/726,694

(22) Filed: Nov. 29, 2000

(65) Prior Publication Data

US 2002/0014767 A1 Feb. 7, 2002

(30) Foreign Application Priority Data

Dec. 1, 1999  (DE) .......................................... 199 57 802

(51) Int. Cl.[7] ............................................ B60R 22/343
(52) U.S. Cl. ........................ 280/806; 180/268; 280/807; 297/477; 297/479; 297/480
(58) Field of Search ................................ 280/807, 805, 280/806; 180/268; 297/470, 474, 475, 476, 477, 478, 479, 480

(56) References Cited

U.S. PATENT DOCUMENTS 4,478,433 A  * 10/1984  Taguchi et al. ............. 280/807
4,678,134 A  *  7/1987  Ameur ....................... 280/806
6,374,168 B1 *  4/2002  Fujii ........................... 180/268

* cited by examiner

Primary Examiner—Eric Culbreth
(74) Attorney, Agent, or Firm—Tarolli, Sundheim, Covell & Tummino L.L.P.

(57) ABSTRACT

The belt retractor of the occupant restraint system comprises a frame, a belt reel rotatably mounted in the frame, a locking mechanism for selectively blocking the belt reel and a vehicle-sensitive sensor. The locking mechanism is actuated by an actor. An electronic control unit is provided with an input interface and an output interface. The vehicle-sensitive sensor is connected to the input interface and the actor is connected to the output interface.

12 Claims, 5 Drawing Sheets

VEHICLE OCCUPANT RESTRAINT SYSTEM

FIELD OF INVENTION

The invention relates to a vehicle occupant restraint system comprising at least one belt retractor comprising a frame, a belt reel rotatably mounted in the frame, a locking mechanism for selectively blocking the belt reel and a vehicle-sensitive sensor.

BACKGROUND OF THE INVENTION

In addition to the usual belt webbing and/or vehicle-sensitive locking functions modern belt retractors may need to be equipped with additional functions where necessary. One of these additional functions is safeguarding loads or child seats by a blocking condition which is activated by total withdrawal and subsequent renewed retraction of the belt webbing. Switching back into the emergency locking condition is achieved by total retraction of the belt webbing. Another additional function is a buckled up indication for which the withdrawn belt webbing length is sensed.

Such additional functions of a belt retractor necessitate a high complexity of mechanical components. A particularly high amount of design labour is required to provide a variety of different belt retractor types for each of the additional functions required.

BRIEF SUMMARY OF THE INVENTION

The invention provides an occupant restraint system which in the field of belt retractors enables a series of optional functions, relevant in terms of safety and comfort.

The belt retractor of the restraint system in accordance with the invention contains a frame, a belt reel rotatably mounted in the frame, a locking mechanism for selectively blocking the belt reel and a vehicle-sensitive sensor. For actuating the locking mechanism an actor is provided. The functions of the belt retractor are controlled by an electronic control unit including an input interface and an output interface. The vehicle-sensitive sensor is connected to the input interface and the actor is connected to the output interface. It is this basic design concept that facilitates adapting the locking and retraction functions of the belt retractor to the respective requirements, since merely program data need to be adapted, according to which the electronic control unit works. Furthermore, various sensors can be connected to the input interface of the electronic control unit, the output signals of which are taken into account in driving the locking mechanism. Likewise further actors or positioners and the like may be connected to the output interface of the electronic control unit, the functions of which are controlled depending on the sensor signals as polled via the input interface of the electronic control unit. The rotary drive of the belt reel, in particular a servomotor, can not only undertake the function of the retraction spring of the conventional mechanical belt retractor, but can also assure a pretensioning of the belt webbing in case of an imminent vehicle crash or a tensioning of the belt webbing in defined situations. In particular, the invention provides a vehicle occupant restraint system which comprises at least one belt retractor which has a frame, a belt reel rotatably mounted in the frame, a locking mechanism for selectively blocking the belt reel, an actor for actuating the locking mechanism and an electric rotary drive coupled to the belt reel. An electronic control unit has an input interface for sensor signals and an output interface having post-connected drivers for driving the actor and the electric rotary drive.

The sensor signals comprise:
occupant detection signals,
vehicle condition signals,
vehicle environment signals;

The sensor signals are combined in the electronic control unit according to a predetermined triggering scheme, for the output of driving signals at the output interface, by which signals:

the belt reel is selectively acted upon with a controlled torque for winding up of belt webbing;

the belt reel is selectively driven with a controlled torque for tensioning the belt webbing;

the belt reel is selectively driven with a maximum available torque for tightening the belt webbing;

the actor selectively actuates the locking mechanism.

One of the sensors connected to the input interface furnishes in the preferred embodiment an incremental signal representing the rotation of the belt reel, preferably in conjunction with a further signal indicating the sense of rotation. These signals are analyzed by the electronic control unit by up/down counting to determine the absolute angle of rotation of the belt reel and thus the length of the belt webbing withdrawn.

In this preferred embodiment the belt retractor offers the following functions, some of which may also be achieved only when required:

child seat/load safeguarding
buckled up detection
vehicle-sensitive blocking
retraction spring
comfort gearing
blocking or belt tensioning on non-locked back rest
belt webbing-sensitive blocking
belt webbing pretensioning
belt webbing tensioning.

BRIEF DESCRIPTION OF THE DRAWING

Further advantages and features of the invention read from the following description of several embodiments and from the drawings to which reference is made and in which.

DETAILED DESCRIPTION OF THE INVENTION

Figure 1:
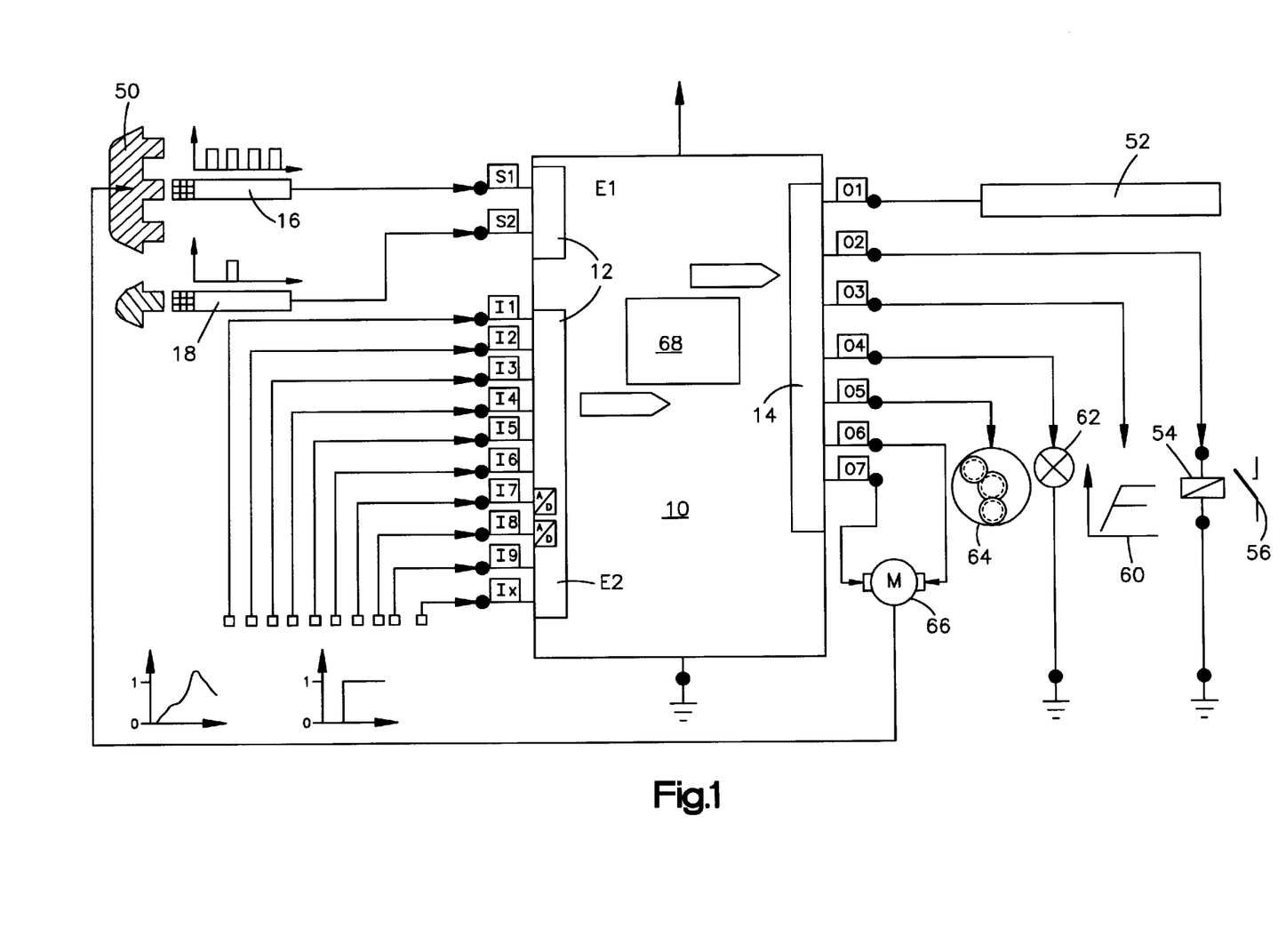
FIG. 1 is a block diagram of an electronic control unit including sensors and actors connected thereto.

For controlling the functions of the belt retractor according to the invention there is provided an electronic control unit 10 illustrated in FIG. 1. The electronic control unit 10 is provided with an input interface 12 which in the selected arrangement is divided into two groups E1, E2; this dividing, however, having only symbolic significance. In addition, the controller 10 comprises an output interface 14.

The group E1 of the input interface 12 contains two inputs identified S1 and S2. Connected to the input S1 is a sensor 16 which is configured as an incremental transmitter and which on rotation of the belt reel of the belt retractor delivers a pulse at a predetermined angle of rotation. The incrementing signals delivered by this sensor 16 are configured by known ways and means such that their sequence is an indication of the rotational sense of the belt reel. For example, the sensor 16 consists of two discrete encoders whose signals are delivered staggered in time. The sensor 16 may be an optical sensor or also a magnetic sensor.

Connected to the input identified S2 is a sensor 18 which delivers a synchronization signal as of a predetermined absolute angle of rotation of the belt reel of the belt retractor. This synchronization signal is generated, for example, every time the belt webbing is fully withdrawn from the belt reel. Synchronization then occurs such that an incremental counter contained in the control unit 10 as driven by the incrementing signals of the sensor 16 is set to zero, corresponding to the absolute angle of rotation 0° of the belt reel.

The group E2 of the input interface 12 contains the signal inputs I1 Ix which may be both digital and also analog inputs.

Input I1 receives a digital signal indicating whether the back rest in which the belt retractor is mounted, where necessary, is locked or not.

Input I2 receives a digital signal indicating whether the seat belonging to the belt retractor is occupied.

Input I3 receives a digital or also analog signal representing the weight of the occupant on the seat belonging to the belt retractor.

Input I4 receives the preferably digital signal of a vehicle-sensitive sensor.

Input I5 likewise receives a preferably digital signal of an impact sensor.

Input I6 receives a digital signal from a belt buckle switch.

Input I7 receives a preferably analog seat position signal.

Input I8 likewise receives a preferably analog back rest signal indicating the inclination of the back rest.

Input I9 receives a digital signal from an external sensor switch.

Input Ix is available for receiving any further sensor signals to be taken into account.

The output interface 14 contains the outputs O1 to O7.

Connected to the output O1 is a belt tensioner, for example provided with a pyrotechnic drive. This may be a belt buckle tensioner, an end fitting tensioner or also a rotational tensioner arranged on the belt retractor.

Connected to the output O2 is a solenoid for activating a locking pawl. When the locking pawl is activated, rotation of the belt reel in the frame is blocked in a load-bearing manner.

Connected to the output O3 is a multistage force limiter. The signal delivered at the output O3 sets the force limiter to the load level as appropriate to the respective situation.

Connected to the output O4 is a warning device, for example, a warning lamp.

The output O5 signals a child/load safeguarding effecting the belt retractor being locked in the withdrawal direction once the belt webbing has been fully withdrawn and rewound; this locking not being effective in the winding direction.

Connected, finally, between the outputs O6 and O7 of the output interface 14 is an electric motor for powering the belt reel of the belt retractor. As evident from FIG. 1 the sensors 16 and 18 are integrated in this electric motor and mounted for example on a circuit board on which the various electronic components of a motor controller are arranged.

Both the inputs of the input interface 12 and the outputs of the output interface 14 are enabled depending on the function required by the belt retractor, the basic function of which is the vehicle-sensitive blocking of belt reel rotation. For this function only input I4 and output O2 need to be enabled, whereas if a child/load safeguarding is required the absolute angle of rotation of the belt retractor (corresponding to the withdrawn belt webbing length) needs to be determined. For this purpose the signals at the inputs S1 and S2 are required. The signal at input I1 is only required when the belt retractor is fitted to a fold-down back rest, this assuming that the belt retractor reel needs to be blocked as long as the back rest is not satisfactorily locked in place.

Employing an electric motor in place of the conventional retractor spring for rotating the belt reel opens up the possibility of new retractor functions, more particularly a comfort function in which the belt webbing force is reduced in a defined range of angular rotation of the belt reel, a pretensioning of the belt webbing in defined situations, and a pretensioning of the belt webbing in an imminent vehicle crash or in a critical driving situation.

Figure 2:
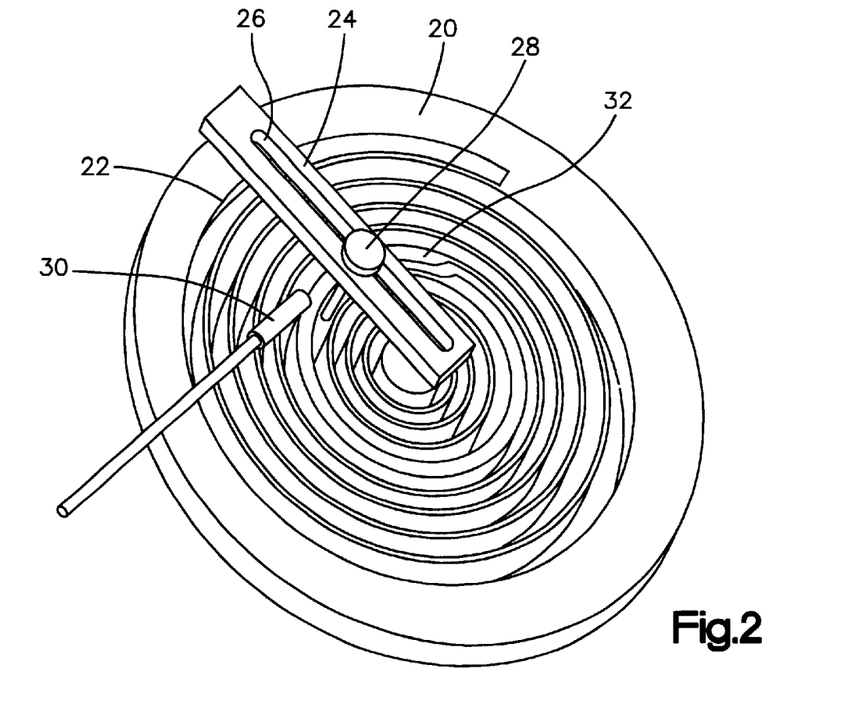
FIG. 2 is a perspective view of a synchronization device.
Figure 3:
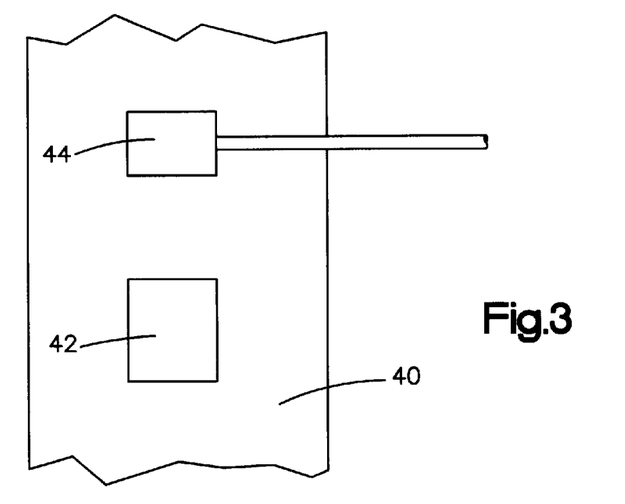
FIG. 3 is a schematic view of another embodiment of a synchronization device.

For determining the absolute angle of rotation of the belt reel on the basis of the incrementing signals of the sensor 16 the synchronization signal of the sensor 18 is required. FIGS. 2 and 3 illustrate two embodiments of a synchronization device for generating the synchronization signal.

Referring now to FIG. 2 there is illustrated an embodiment incorporating a disk 20 comprising a spiral groove 22, the disk being non-rotatably connected to the belt reel. Arranged in a guide 24 secured to the frame of the belt retractor is a radial slot 26. Guided in this radial slot 26 is a pin-type cam follower 28 which simultaneously engages the spiral groove 22. A sensor 30 is arranged in the position opposite to the cam follower 28 once the latter has attained a predetermined radial position corresponding practically to the belt webbing being fully withdrawn. At a suitable level the spiral groove 22 comprises a surface irregularity 32 resulting in an enhanced radial movement component of the cam follower 28 on rotation of the disk 20 to thus furnish a distinct synchronization signal.

Referring now to FIG. 3 there is illustrated an embodiment in which a permanent magnet 42 is woven into the belt webbing 40, this permanent magnet cooperating with a magnetic sensor 44 applied to the frame of the belt retractor. The synchronization signal is generated when the permanent magnet 42 passes the sensor 44.

Figure 4:
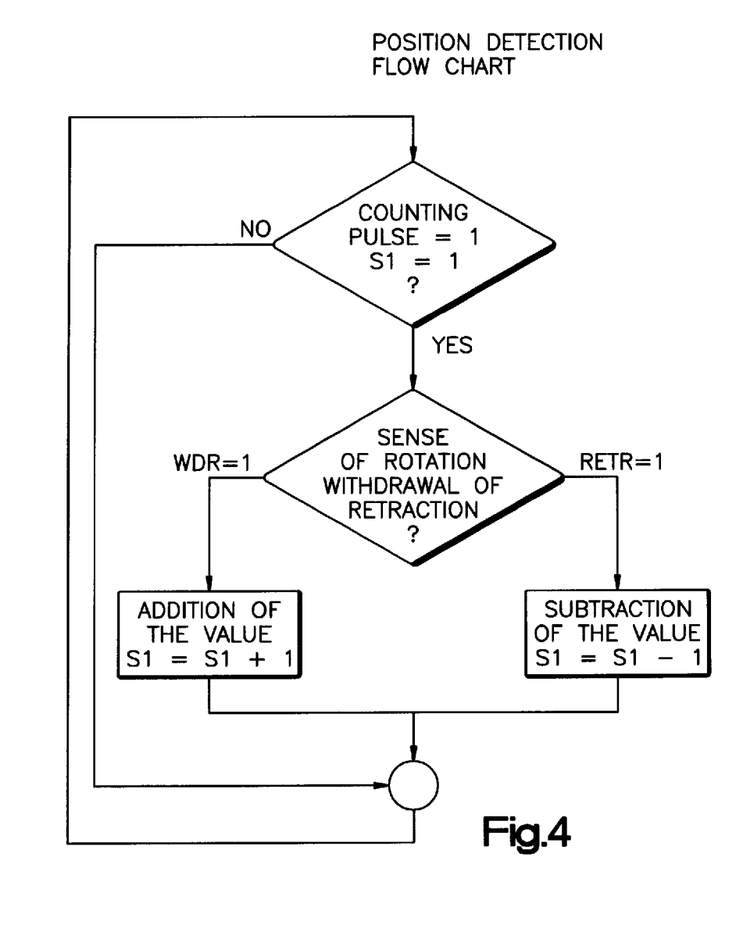
FIG. 4 is a flow chart referring to detection of the angle of rotation.
Figure 5:
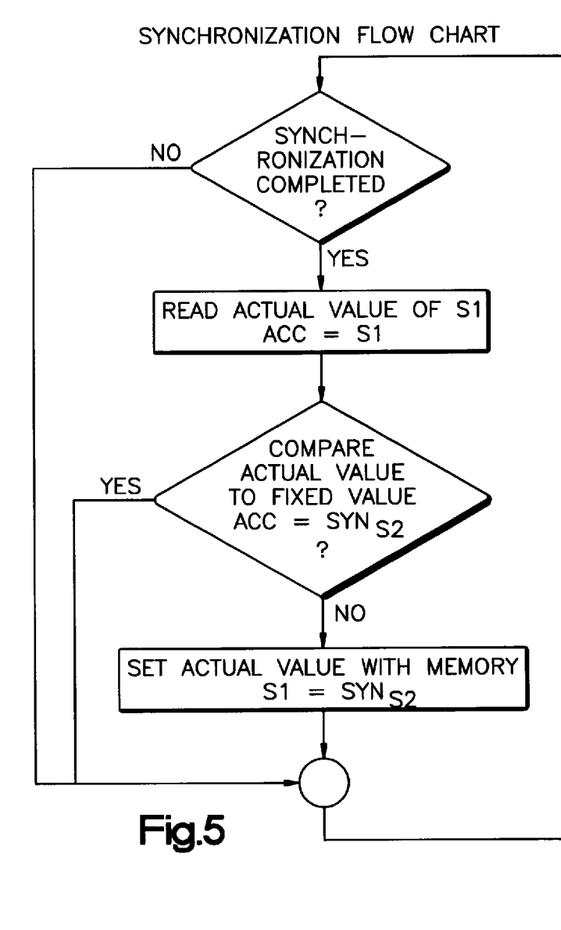
FIG. 5 is a flow chart referring to synchronization of the rotary angle sensor.

The flow charts in FIGS. 4 and 5 are self-explanatory in respect of determining the absolute angle of rotation of the belt reel (FIG. 4) and how synchronization is done (FIG. 5).

Figure 6:
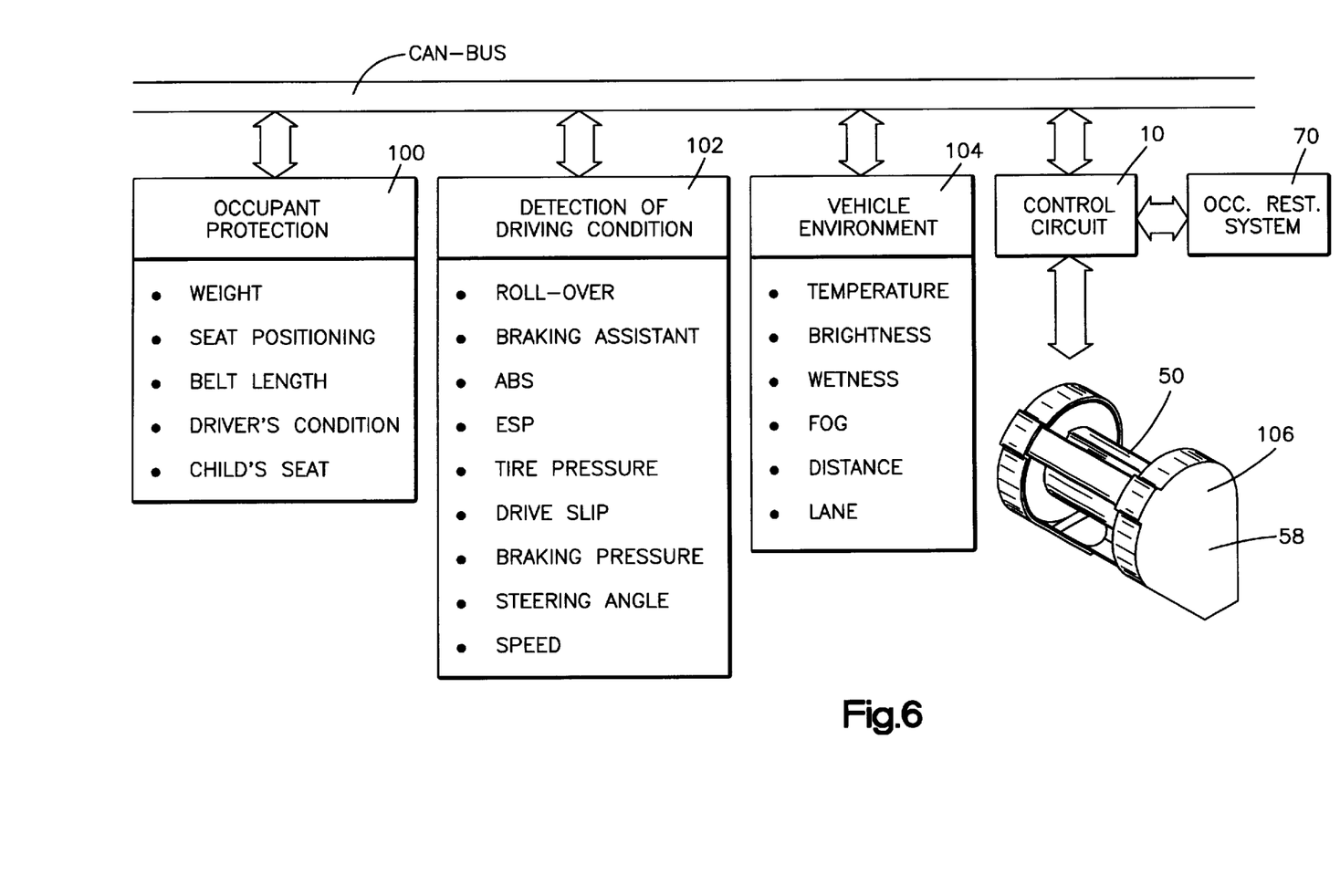
FIG. 6 is a block diagram of the occupant restraint system.

According to the block diagram shown in FIG. 6, the occupant restraint system makes use of the CAN bus available in modern vehicles. A plurality of sensors is coupled to this bus. Three groups of sensors are important for the functions of the restraint system:

a) In the group of sensors identified by reference number 100 there are grouped those for an occupant detection. Included are in particular the weight, seat position (longitudinal and vertical position), the length of belt webbing withdrawn, the driver's condition (biometrical detection, in particular tendency to fall asleep), presence of a child's seat.

b) In the group identified by 102 there are grouped sensors which serve the detection of the driving condition. Included are in particular roll-over (rolling about the longitudinal axis), braking assistance, ABS, ESP, tire pressure, drive slip, braking pressure, steering angle, vehicle speed.

c) In the group identified by 104 there are grouped sensors which serve the detection of the vehicle environment. Included are in particular the outdoor temperature, the brightness, wetness, fog, distance of the vehicle from an obstacle, lane tracking (detecting a deviation from the traffic lane).

Each of the groups 100, 102, 104 can be optionally supplemented by further sensors.

Further, connected to the CAN bus is a control circuit 10 which for its part addresses the belt retractor referenced by 106.

The signals delivered by the various sensors are processed according to an algorithm laid down in the program memory of the control circuit 10. The respective constellation of the sensor signals and the evolution of their occurrence decide on the triggering of the following actions:

1) normal winding operation of the belt retractor;
2) belt webbing tensioning with increased retracting torque (slight pretensioning)
3) belt webbing pretensioning with maximum available retracting torque.

Additional emergency functions are independent from the preceeding functions, in particular the activation of the locking mechanism of the belt reel, the triggering of a pyrotechnical belt webbing tensioner and the activation of inflatable restraint devices. Moreover, there will be made a conditioning of the components of the restraint system as a function of the sensor signals detected, in particular an adjustment of the force level of a force limiter on the belt retractor and the determining of the actuating stage of the inflatable restraint devices.

Figure 7:
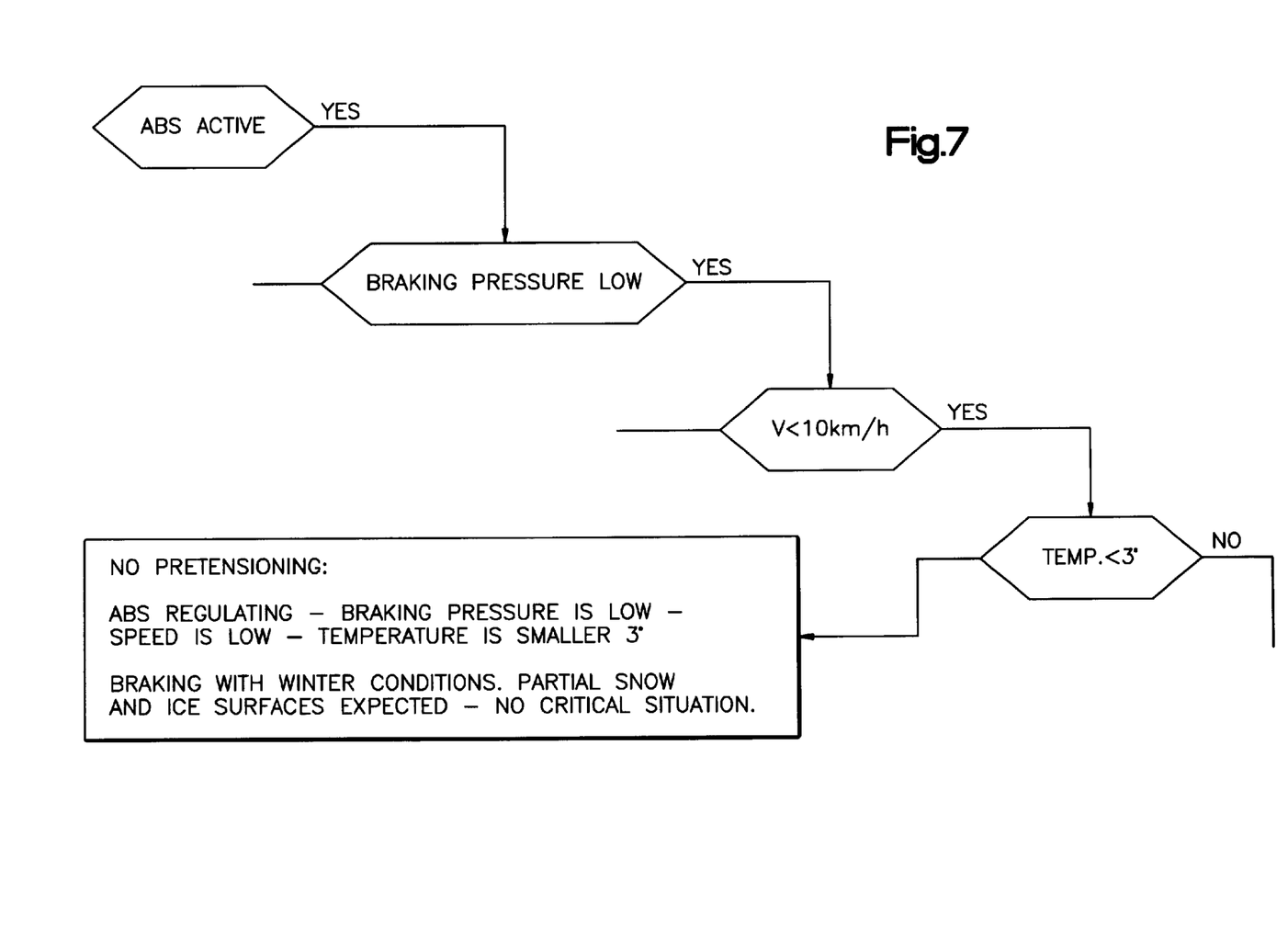
FIG. 7 is a flow chart.

FIG. 7 shows as an example part of an algorithm which decides on triggering various actions. It is to be noted that the sequential execution of parameter checks depends on the result of antecedent checks.

In the following tables there are listed numerous constellations of sensor signals, their evaluation and the actions resulting therefrom. Although these tables have only exemplary character, they show some particular features of the occupant restraint system according to the invention. Included are considering the tire pressure, the roll over condition and the OOP situation. In the latter case, the occupant concerned is smoothly and suggestively required to assume a regular sitting posture by the tensioning of the belt webbing occurring after a specific period of time.

What is claimed is:

1. A vehicle occupant restraint system with at least one belt retractor comprising:
   a frame;
   a belt reel rotatably mounted in said frame;
   a locking mechanism for selectively blocking said belt reel;
   an actuator for actuating said locking mechanism; and
   an electric rotary drive coupled to said belt reel, and comprising an electronic control unit including an input interface for sensor signals and an output interface being connected to drivers for driving said actuator and said electric rotary drive,
   said sensor signals including occupant detection signals, vehicle condition signals, and vehicle environment signals;
   said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;
   a memory module associated with said control unit, in which program data dictating functioning of said control unit as well as parameter data defining said triggering scheme are stored at least in part; and
   a rotary angle incremental transmitter associated with said belt reel, said transmitter being connected to said input interface and delivering for each rotary angle increment of said belt reel an incremental pulse to said input interface, said incremental pulse containing information as to a rotational sense of said belt reel, said electronic control unit determining from said information of said incremental pulse an absolute angle of rotation of said belt reel representing a withdrawn belt webbing length;
   said control unit deriving from said absolute angle of rotation of said belt reel of a belt buckled-up indication signal.

2. The occupant restraint system as set forth in claim 1, wherein the output of specific driving signals is a function of a plurality of parameter data which are simultaneously detected.

3. The occupant restraint system as set forth in claim 1, wherein the output of specific driving signals is a function of a plurality of criteria which are fulfilled or not fulfilled at a moment, said criteria being represented by said parameter data.

4. The occupant restraint system as set forth in claim 1, wherein the output of specific driving signals is a function of a plurality of parameter data detected in a predetermined sequence.

5. The occupant restraint system as set forth in claim 1, wherein the output of a driving signal, upon detection of specific precedent parameter data, is enforced independently of other parameter data detected simultaneously.

6. The occupant restraint system as set forth in claim 1, wherein the output of a driving signal, upon detection of specific precedent parameter data, is suppressed independently of other parameter data detected simultaneously.

7. The occupant restraint system as set forth in claim 1, wherein said program data define an algorithm, in which parameter checks are performed sequentially and dependent on the result of antecedent parameter checks.

8. A vehicle occupant restraint system with at least one belt retractor comprising:
   a frame;
   a belt reel rotatably mounted in said frame;
   a locking mechanism for selectively blocking said belt reel;
   an actuator for actuating said locking mechanism; and
   an electric rotary drive coupled to said belt reel, and comprising an electronic control unit including an input interface for sensor signals and an output interface being connected to drivers for driving said actuator and said electric rotary drive,
   said sensor signals including occupant detection signals, vehicle condition signals, and vehicle environment signals;

said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;

a memory module associated with said control unit, in which program data dictating functioning of said control unit as well as parameter data defining said triggering scheme are stored at least in part;

a rotary angle incremental transmitter associated with said belt reel, said transmitter being connected to said input interface and delivering for each rotary angle increment of said belt reel an incremental pulse to said input interface, said incremental pulse containing information as to a rotational sense of said belt reel, said electronic control unit determining from said information of said incremental pulse an absolute angle of rotation of said belt reel representing a withdrawn belt webbing length;

said control unit deriving from said absolute angle of rotation of said belt reel an indicator signal which indicates whether said belt is buckled up or not.

9. A vehicle occupant restraint system with at least one belt retractor comprising:

a frame;

a belt reel rotatably mounted in said frame;

a locking mechanism for selectively blocking said belt reel;

an actuator for actuating said locking mechanism; and an electric rotary drive coupled to said belt reel, and comprising an electronic control unit including an input interface for sensor signals and an output interface being connected to drivers for driving said actuator and said electric rotary drive, said sensor signals including occupant detection signals, vehicle condition signals, and vehicle environment signals;

said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;

a memory module associated with said control unit, in which program data dictating functioning of said control unit as well as parameter data defining said triggering scheme are stored at least in part;

a rotary angle incremental transmitter associated with said belt reel, said transmitter being connected to said input interface and delivering for each rotary angle increment of said belt reel an incremental pulse to said input interface, said incremental pulse containing information as to a rotational sense of said belt reel, said electronic control unit determining from said information of said incremental pulse an absolute angle of rotation of said belt reel representing a withdrawn belt webbing length;

said control unit deriving from said absolute angle of rotation of said belt reel an indicator signal which indicates a condition of exposure to a possible activation of a further component of said vehicle occupant restraint system.

10. A vehicle occupant restraint system with at least one belt retractor comprising:

a frame;

a belt reel rotatably mounted in said frame;

a locking mechanism for selectively blocking said belt reel;

an actuator for actuating said locking mechanism; and an electric rotary drive coupled to said belt reel, and comprising an electronic control unit including an input interface for sensor signals and an output interface being connected to drivers for driving said actuator and said electric rotary drive, said sensor signals including occupant detection signals, vehicle condition signals, and vehicle environment signals;

said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;

wherein at said output interface at least one indicator signal is available for a further component of said occupant restraint system, said further component being at least one of an inflatable protective cushion and a knee protector.

11. A vehicle occupant restraint system with at least one belt retractor comprising:

a frame;

a belt reel rotatably mounted in said frame;

a locking mechanism for selectively blocking said belt reel;

an actuator for actuating said locking mechanism; and an electric rotary drive coupled to said belt reel, and comprising an electronic control unit including an input interface for sensor signals and an output interface being connected to drivers for driving said actuator and said electric rotary drive, said sensor signals including occupant detection signals, vehicle condition signals, and vehicle environment signals;

said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;

said vehicle condition signals are provided by at least two of the following sensors, a braking assistance sensor, an ABS sensor, an electronic stability program sensor, a tire pressure sensor, a drive slip sensor, a braking pressure sensor, and a steering angle sensor.

12. A vehicle occupant restraint system with at least one belt retractor comprising:

a frame;

a belt reel rotatably mounted in said frame;

a locking mechanism for selectively blocking said belt reel;

an actuator for actuating said locking mechanism; and an electric rotary drive coupled to said belt reel, and comprising an electronic control unit including an input interface for sensor signals and an output interface being connected to drivers for driving said actuator and said electric rotary drive, said sensor signals including occupant detection signals, vehicle condition signals, and vehicle environment signals;

said sensor signals being combined in said electronic control unit according to a predetermined triggering scheme for the output of driving signals at said output interface, by which driving signals said belt reel is selectively acted upon with a controlled torque for winding up of belt webbing, said belt reel is selectively driven with a controlled torque for tensioning said belt webbing, said belt reel is selectively driven with a maximum available torque for tightening said belt webbing, and said actuator selectively actuates said locking mechanism;

wherein said vehicle environment signals are provided by at least two of the following sensors, a temperature sensor, a brightness sensor, a fog sensor, and a lane tracking sensor.

* * * * *